United States Patent
Bhat et al.

(10) Patent No.: US 9,729,349 B2
(45) Date of Patent: Aug. 8, 2017

(54) SYSTEMS AND METHODS FOR DESIGNATING PACKETS FOR CUSTOMIZED DATA PROCESSING IN PORT-EXTENDED ARCHITECTURES

(71) Applicant: Cisco Technology, Inc., San Jose, CA (US)

(72) Inventors: Ganesh Srinivasa Bhat, Union City, CA (US); Stanley Ho, Millbrae, CA (US); Manpreet Singh Sandhu, San Jose, CA (US); Moiz Alam, Irvine, CA (US); Subrat Mohanty, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 246 days.

(21) Appl. No.: 14/565,556

(22) Filed: Dec. 10, 2014

(65) Prior Publication Data

US 2016/0359641 A1    Dec. 8, 2016

(51) Int. Cl.
*H04L 12/46* (2006.01)
*H04L 12/931* (2013.01)
*H04L 29/06* (2006.01)
*H04L 12/935* (2013.01)

(52) U.S. Cl.
CPC ........ *H04L 12/4666* (2013.01); *H04L 49/208* (2013.01); *H04L 49/3009* (2013.01); *H04L 63/0254* (2013.01); *H04L 63/101* (2013.01)

(58) Field of Classification Search
None
See application file for complete search history.

(56) References Cited

U.S. PATENT DOCUMENTS

| | | | | |
|---|---|---|---|---|
| 2008/0310416 A1* | 12/2008 | Nozue | ................ | H04L 12/4645 370/392 |
| 2009/0161676 A1* | 6/2009 | Breau | ................ | H04L 63/0263 370/392 |
| 2013/0058229 A1* | 3/2013 | Casado | ................ | H04L 45/745 370/252 |
| 2014/0269710 A1* | 9/2014 | Sundaram | ............ | H04L 45/302 370/392 |
| 2015/0256405 A1* | 9/2015 | Janardhanan | ........... | H04L 41/12 370/255 |

* cited by examiner

*Primary Examiner* — Charles C Jiang
*Assistant Examiner* — Saad Khawar
(74) *Attorney, Agent, or Firm* — Meunier Carlin & Curfman LLC

(57) ABSTRACT

A method for specialized processing of data in a port-extended network comprises receiving, by the control node of the port-extended network, a data frame that includes, at a first field of the data frame, information indicative of an incoming port at which the data frame was received, the first field having been inserted by a satellite node associated with the port. The method also comprises determining that one or more packets of a frame require specialized processing, and replacing the information contained in the first field with information indicative of the specialized processing. The method further comprises replacing information contained in a second field with information indicative of an outgoing port of a second satellite node of the port-extended network. A modified data frame is transmitted onto the port-extended network, the modified data frame that includes the information indicative of the specialized processing in the first field.

16 Claims, 6 Drawing Sheets

SYSTEMS AND METHODS FOR DESIGNATING PACKETS FOR CUSTOMIZED DATA PROCESSING IN PORT-EXTENDED ARCHITECTURES

TECHNICAL FIELD

The present disclosure relates generally port-extended architectures and, more particularly, to systems and methods for efficient reassignment of unused frame tag headers for addressing packets for addressing specialized distributed processing.

BACKGROUND

Conventional modular switch architectures relied on the use of a supervisor module coupled to one or more port termination modules (i.e., "line cards") through specialized (and often proprietary) backplane circuitry. Because each modular switch typically required its own supervisor module, network expansion that required additional switches also increased the number of supervisor modules. The increase in number of supervisor modules resulted in a corresponding increase in network complexity and overhead.

In an effort to contain the growth of management modules (and corresponding network management overhead) in a particular network segment, solutions for distributing or "extending" line card functionality were developed. Conventional line card functionality was moved from the modular switch (coupled to a dedicated to supervisor module) to a standalone enclosure that could be remotely connected back to a supervisor module over standard Ethernet. Using these "port-extended" architectures, network expansion to a remote location no longer required a complete modular switch (with a dedicated supervisor module and line card modules). Instead, one or more less expensive standalone line card modules could be installed and configured for control by an existing supervisor module.

In the port-extended data plane architecture, switching is generally performed on the supervisor module. Frames received on satellite host (i.e. port termination module) ports may be sent over a "fabric link" to the controller where they are switched. For correct packet switching, the supervisor module should, in the inbound direction, know the host port on which the packet arrived (or, in the outbound direction, must specify the host port on which the packet should leave). An Ethernet technology known as "vnTag" (i.e., virtual NIC tag) addresses this issue. Each satellite host port is assigned an identifier known as a "vif_id." Once a fabric link is brought up by SDP (Satellite Discovery Protocol) and put into use, each frame transiting a fabric link includes a "vnTag" header that contains fields for "src vif_id" (SVIF) and "dst vif_id" (DVIF).

The presently disclosed systems and methods for designating packets for customized data processing in port-extended architectures are directed to overcoming one or more of the problems set forth above and/or other problems in the art.

DETAILED DESCRIPTION OF THE EXAMPLE EMBODIMENTS

Overview

Figure 1:
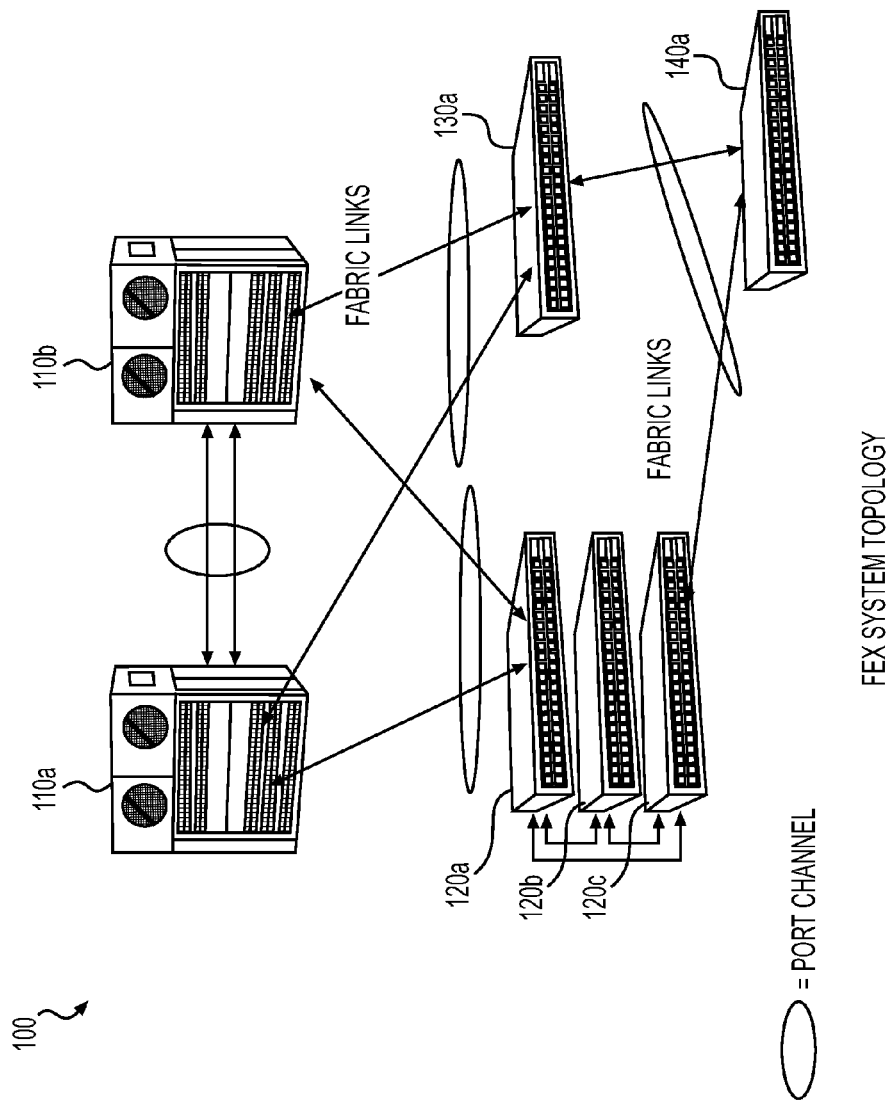
FIG. 1 illustrates an exemplary port-extended network environment, such as a fabric-extended network, consistent with certain disclosed embodiments.

In accordance with one aspect, the present disclosure is directed to a method for specialized processing of data in a port-extended network having a control node and a plurality of satellite nodes. The method may comprise receiving, by the control node of the port-extended network, a data frame that includes, at a designated field (or first) field of the data frame, information indicative of an incoming port at which the data frame was received, the first field having been inserted by a satellite node associated with the port. The method includes determining, by the control node of the port-extended network, that one or more packets of a frame require specialized processing, and replacing the information contained in the first field with information indicative of the specialized processing. Information contained in a second designated field may be replaced with information indicative of an outgoing port of a second satellite node of the port-extended network. The method may further comprise transmitting, by the control node onto the port-extended network, a modified data frame that includes a payload associated with the received data frame, the information indicative of the specialized processing in the first field, and the information indicative of the outgoing port in the second field.

According to another aspect, the present disclosure is directed to a port-extendable system, comprising a control node configured for coupling to one or more satellite nodes. The control node is configured to receive a data frame that includes a first field having information indicative of an incoming port at which the data frame was received, the first field having been inserted by a satellite node associated with the port. The control node may also be configured to determine that one or more packets of a frame require specialized processing, and replace the information contained in the first field with information indicative of the specialized processing. The control node may be further configured to replace information contained in a second field with information indicative of an outgoing port of a second satellite node of the port-extended network. A modified data frame may be transmitted that includes a payload associated with the received data frame, the information indicative of the specialized processing in the first field, and the information indicative of the outgoing port in the second field.

In accordance with yet another aspect, the present disclosure is directed to a method for reassigning unused frame tag headers for addressing packets for specialized egress processing. The method may comprise determining, by a control node of a fabric-extended system, that one or more packets of a frame are designated for specialized egress processing. The method may also comprise replacing data contained in the "source vif_id field" (SVIF) of the "virtual NIC tag" (vnTag) with data associated with the specialized egress processing, and replacing data contained in the "destination vif_id field" (DVIF) of the vnTag with data associated with an outgoing port of a satellite node of the fabric-extended system. The method may further comprise transmitting, by the control node, a data frame containing the vnTag to a fabric network associated with the fabric-extended system.

Example Embodiments

FIG. 1 illustrates an exemplary port-extended network environment 100. Port-extended network environment 100 refers to any network environment or architecture that includes a plurality of network devices that, although distributed in individual chassis (and possibly in geographically disparate areas), are configured to be managed as a single network device. For example, as illustrated in FIG. 1, port-extended network environment 100 may include one or more management consoles 110a, 110b (collectively "110") and one or more satellite nodes 120a, 120b, 120c (collectively "120"), 130a, 140a. Management consoles 110 may be coupled to one or more of the satellite nodes 120, 130a, 140a, either directly over Ethernet or through one or more of the other satellite nodes. One or more management consoles 110 may be configured as a master control module over the other management consoles and/or satellite nodes 120, 130a, 140a, providing a common control plane and management interface to port-extended network environment 100 as a single network element. Port-extended networks are sometimes also referred to as "fabric-extended" (FEX) networks, with the interconnect network between one or more management consoles 110 and satellite nodes 120, 130a, 140a referred to as the "fabric" or "fabric network."

Port-extended network environment 100, as the term is used herein, refers to any environment in which the size and capacity of the network environment is virtually "elastic" with the number of ports expandable and retractable with the addition of addition (or removal) of port expansion modules. In some port-extended network environments, the port expansion modules may include or embody modular line cards that are configured to be electrically coupled to management console 110 by way of a local communication bus. In general, modular line cards are mounted in a common chassis of management console 110.

Figure 2:
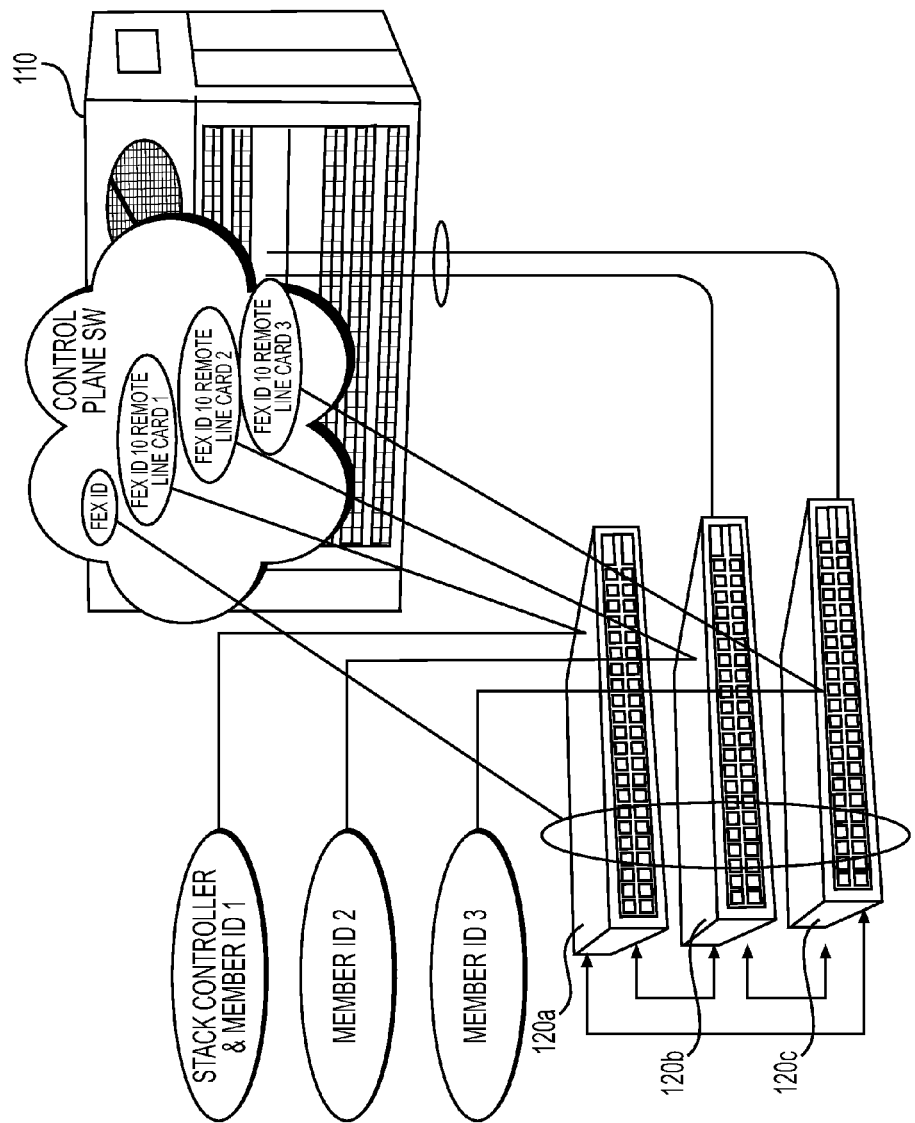
FIG. 2 illustrates an exemplary configuration of a port-extended network comprising a plurality of satellite nodes configured as line-cards associated with a control mode, in accordance with certain disclosed embodiments.

In other embodiments, such as those illustrated in FIGS. 1 and 2, port expansion modules, such as satellite nodes 120, 130a, 140a, may be standalone network devices that can be electronically programmed to operate as either standalone network devices or as "virtual" line cards of a management console 110. Unlike modular port expansion line cards, satellite nodes 120, 130a, 140a may be deployed in geographically disparate locations from management console(s) 110, with communication handled over Ethernet.

As illustrated, for example, in FIG. 1, port-extended system may be configured or embodied as one logical switch that comprises a management console (sometimes referred to as a "FEX-master switch"), such as management console 110a, 110b, one or more satellite nodes 120, 130a, 140a (sometimes referred to as "FEX devices"), and fabric links connecting management console(s) 110 to satellite node(s) 120, 130a, 140a. In an exemplary embodiment, the edge ports (i.e., ports connecting to components outside the logical switch) are uniquely represented on the management console 110 for management actions. The edge ports can be native-ports on the management console or ports on the satellite nodes.

As explained, the link connecting management console (s) 110 to satellite nodes 120, 130a, 140a is typically referred to as a "fabric link." A fabric link has a fabric downlink port (fabric link downward-facing port) on management console (s) 110 to a fabric uplink port (fabric link upward-facing port) on satellite nodes 120, 130a, 140a. The fabric links connecting management console (s) 110 to satellite nodes 120, 130a, 140a may be collectively referred to as "the fabric." The external ports on satellite nodes 120, 130a, 140a may be referred to as port-extended (or FEX) host ports. The external ports on management console(s) 110 may be referred to as controller local ports. The external ports across both management console (s) 110 and satellite nodes 120, 130a, 140a are referred to as external ports.

Viewed externally (either by peers or through management plane), the port-extended system looks like a single, logical switch. Internally to the port-extended system, the system's data plane, control plane, and management plane functionality must be mapped onto management console(s) 110, satellite nodes 120, 130a, 140a, and the protocols running over the fabric connecting the two. To first order, the port-extended system comprises data, control, and management planes centralized at the controller cluster, supported by satellite nodes 120, 130a, 140a, as appropriate. Certain functionality can be distributed back out to satellites, but the functionality is typically directed by the controller rather than handled by the satellite autonomously.

FIG. 2 illustrates an exemplary port-extended network configuration embodied as a "stacked" FEX or port-extended network. In this embodiment, every fabric link may be assigned a specific identification ("FEX ID") by the user through a command line interface and when a satellite node is connected, it becomes bound to the specific fabric port of the management console 110 and is configured with the specific FEX ID. Each satellite node may include or embody a stack of switches in which case the stack members appear to the management console 110 as remote line cards. When a portion of the port-extended network is configured as a stack, one of the satellite nodes 120a is configured as a stack controller for performing the management of the stack, stack table, and a few stack related resources. During provisioning, one of the stack members is elected as stack controller.

When a stack member is replaced, the newly connected device, if different from the removed device, gets a different MEMBER ID. It is possible to assign the old MEMBER ID using a command line interface so that the new member will be treated as replacement of the old member and therefore inherit all the configuration information of the old member. Alternatively, the management console 110 can assign line-card numbers that are independent of the stack member numbers. This will allow for easier pre-provisioning and deterministic identification of satellite nodes 120, 130a, 140a as remote line cards.

Regardless of whether all or part of the port-extended network is provisioned in a stack configuration, in the port-extended dataplane architecture, local switching is not generally performed on the satellite nodes 120, 130a, 140a. Rather, most, if not all, switching is done on the management console(s) 110. Frames received on host ports of one of satellite nodes 120, 130a, 140a may be sent over a fabric link to the management console(s) 110, where switching occurs. For correct packet switching, the management console(s) 110 should know the host port on which the packet arrived (or, in the outbound direction, should specify the host port on which the packet should leave). When storing a MAC address (for a satellite node) and associated port in the management console's ternary content-addressable memory (TCAM), the TCAM must store the host port of satellite node on which the packet entered the port-extended system, not the fabric port on which the packet arrived at the management console.

An Ethernet technology known as vnTag ("virtual NIC tag") may be used to ensure that fabric network addressing is executed properly. The vnTag technology is used in the data-plane to identify the frames to/from satellite ports. Each of the frames communicated over fabric link are encapsulated with a vnTag header. The vnTag header is not visible outside the port-extended system. According to one embodiment, frames entering and leaving on an edge port may not carry vnTag information. A new tag (vnTag) may be added to all the packets between a satellite node and management console 110. Each port of a satellite node is assigned an identifier known as a "vif_id" that is carried in the vnTag header.

Once a fabric link is brought up by SDP (Satellite Discovery Protocol) and put into use, each frame entering a fabric link includes a "virtual NIC tag" (vnTag) header that contains fields for "src vif_id" (or Source Virtual Interface, "SVIF") and dst vif_id (or Destination Virtual Interface, "DVIF"). The vnTag is typically added when the frame is sent on the fabric link (upon receipt by a host port of a satellite node) and removed when the frame arrives on the fabric link. Thus, fabric ports are typically designed to understand "vnTagged" frames. Similarly, frames entering and leaving on a host port of a satellite node do not carry "vnTag" information. In other words, the vnTag header is not visible outside the port-extended system. The vnTag header format is illustrated in the block diagram of FIG. 3.

Furthermore, those skilled in the art will recognize the particular implementations described herein for developing the "fabric network" for facilitating communication between management console 110 and satellite nodes 120, 130a, 140a in order to maintain the "single logical switch" implementation is exemplary only, and not intended to be limiting. For example, the configuration and arrangement of the information that is added to frames received into the fabric are samples. Indeed, other types of formats (besides vnTag) may be used for communicating data over a port-extended fabric network. For instance, it is contemplated that IEEE 802.1BR specification, which is a standardized version related to the presently disclosed vnTag technology, may be used in combination with or as an alternative to, the presently disclosed implementations that describe FEX implementations that use vnTag header technology. IEEE 802.1BR calls for a slightly different header format and uses a different control protocol (PE-CSP). Despite of these differences, the principal of operation is the same as FEX technologies that employ vnTag header implementations.

Figure 3:
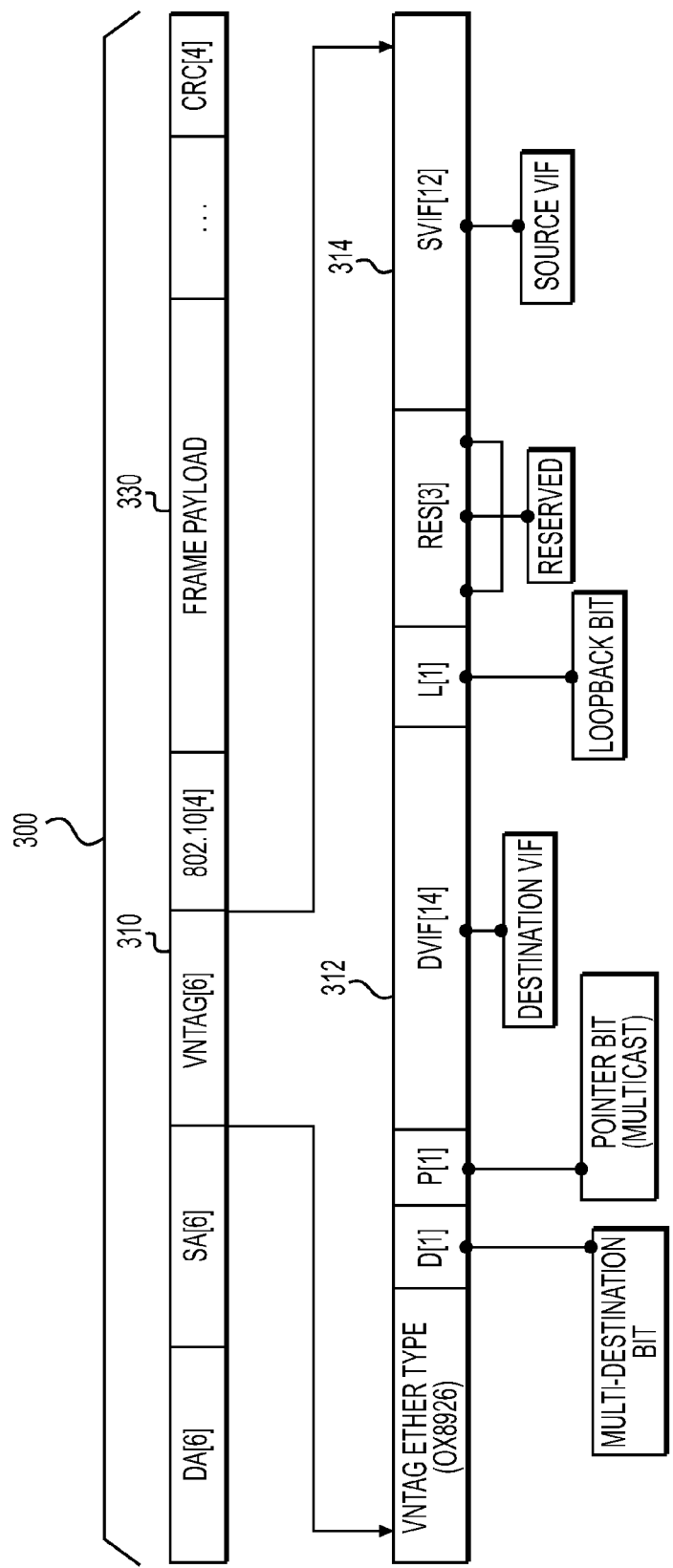
FIG. 3 is a block diagram of an exemplary data frame used to communicate at a fabric layer of the port-extended network, consistent with certain disclosed embodiments.

FIG. 3 illustrates an exemplary embodiment of the types of information that is added to a packet 300 that is to be transmitted via the port-extended fabric network. For example, in FEX networks that use the vnTag information, the vnTag header 310 may be added as an additional field to packet 300. The vnTag header may include a number of data fields containing information for ensuring reliable transfer of the packet throughout the port-extended network fabric. Notably, and as explained above, the vnTag header includes fields for including source and/or destination information for transferring information across fabric ports. Processes and systems consistent with the disclosed embodiments leverage the specific use of the DVIF and SVIF field data to control the performance of any specialized packet processing that may be required.

When information enters the fabric network of port-extended environment 100, a vnTag may be added to an ingress packet on an incoming port of a satellite node(s). The vif_id associated with the ingress port is then added as SVIF, and the DVIF is set to zero. The SVIF represents the original ingress port of the satellite node as the frame travels to the management console 110 on the fabric uplink. The forwarding process, access control, QoS policies and other control plane applications running on the management console 110 use the ingress port vif_id to identify the ingress port. Depending on the configuration of the port-extended network, some of the functions such as QoS, ACLS can be offloaded to satellite node(s) 120, 130a, 140a. Note that the management console 110 may translate the incoming SVIF to a port label specific to management console 110 and use that identifier for further processing within the management console 110. In one embodiment, a given SVIF received on a fabric port will map to a unique port identifier.

According to one exemplary embodiment, the management console 110 may be configured to perform all the L2/L3 switching functionality. For unicast frames, the destination could be a native edge port or another satellite port that could be either on the same ingress FEX or on a different FEX. The packets that egress on native edge port, vnTag is stripped. For packets that egress on another satellite port, vif_id assigned to the egress satellite port is added (as DVIF) to the vnTag and the packet is sent to the FEX hosting the egress port. The FEX uses the DVIF information to identify the egress port, and strips the vnTag before sending the frame out on the egress port.

Figure 4:
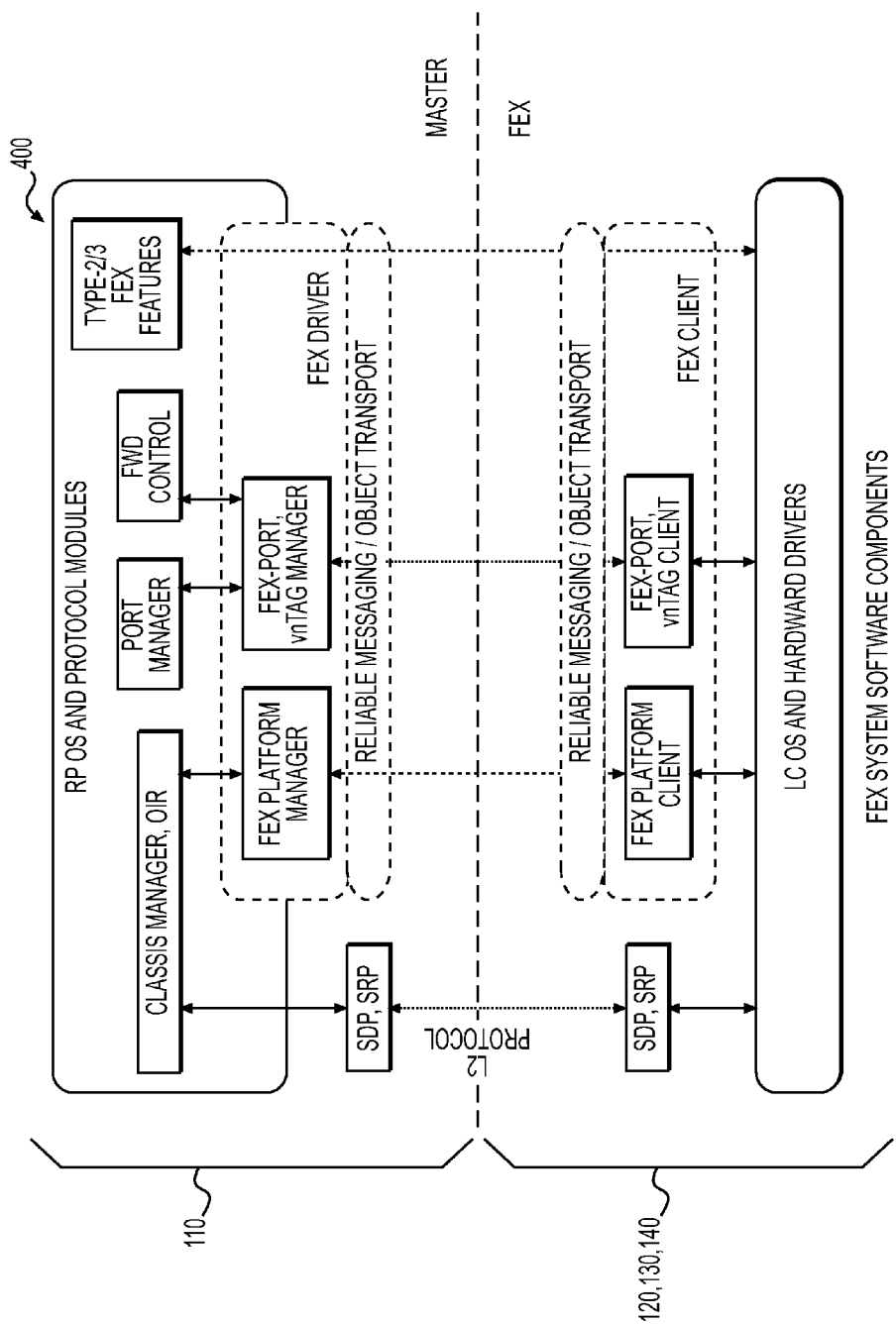
FIG. 4 is a block diagram of exemplary software modules and protocols associated with the port-extended network environment, in accordance with certain disclosed embodiments.

FIG. 4 provides a block diagram of exemplary software architecture 400, including modules and protocols associated with the port-extended network environment, in accordance with certain disclosed embodiments. The diagram in FIG. 4 shows exemplary software components of a management console 110 and satellite nodes 120, 130a, 140a used to deploy the methods consistent with the disclosed embodiments.

Conceptually, the port-extended system 100 can be treated similar to a chassis system where management console 110 is master (or route processor ("RP") and the satellite nodes 120, 130a, 140a are remote intelligent line cards ("LC"). Therefore the management console 110 runs the RP software and satellite nodes 120, 130a, 140a run the LC software. In this model, all the features, control protocols and management runs at the management console 110. The management console 110 controls the line card functionality and coordinates with the line card software to manage various features that reside on the line card. The components such as chassis and port manager that reside within the RP software interact with satellite node driver modules such that FEX platform and ports are identified and integrated into the RP software.

The SDP protocol is used by the management console 110 and satellite nodes 120, 130a, 140a on the fabric ports to advertise their presence and other basic information such as type, serial number, UDI, etc to each other. The registration process is used to further validate the compatibility between the satellite nodes 120, 130a, 140a and management console 110 and register resources on the satellite nodes 120, 130a, 140a with the management console 110. Once the registration is process is complete, the satellite nodes 120, 130a, 140*a* and corresponding ports are made available to the RP software on the management console 110 as a remote chassis with remote line card(s).

Once the initial discovery and registration is complete, the discovery protocol will continue to provide heartbeat or "keep-alive" messages which will ensure the connectivity. It can also be used to ensure that only one satellite node is connected and stays connected to the management console 110 on a given fabric port.

SDP is a simple layer 2 protocol that can be used at the port-extended network initialization. The satellite nodes 120, 130*a*, 140*a* do not have stand-alone configuration CLI, management ports, or IP address. Consequently, the discovery protocol must be simple and must run with minimal configuration. SDP protocol runs on all the fabric ports. If fabric ports are bundled into a logical link, SDP runs on individual links. A device that is connected using bundled links must present itself as the same device on all physical links for the purpose of discovery.

During the initial phase of the discovery, the discovery frames are not vnTag encapsulated. At the end of successful discovery phase, a control channel vif_id is assigned to the satellite node. From that point on, all the communication between satellite node and the management console should to be encapsulated with a vnTag header. The control plane traffic exchanged between the control CPU of the satellite node and that of the management console will use the control channel vif_id assigned to the satellite node. If multiple physical links are used to connect a management console and a satellite node, the SDP frames are exchanged on all the links. The same control channel vif_id is used on all the fabric links.

To start the discovery process, the management console switch advertises its presence on all the fabric ports. Fabric ports are created using the interface CLI. Once a fex_id is associated with an interface on the management console switch, it implicitly changes to a fabric port. Fabric ports can be part of a port channel. The satellite node on the other side, brings up its uplinks (pre-determined by means outside discovery protocol) and responds to the SDP packets received from the management console with its own information. Once the initial exchange is complete, the link is transitioned to vnTag encapsulation mode. The SDP exchanges continue on a periodic basis to serve as a keep-alive mechanism. Note that these messages will be vnTag encapsulated. Once the discovery is complete on the management console and satellite nodes (determined independently on each side), a "remote_chassis" object is instantiated on the management console to represent the satellite node. This remote_chassis object is identified using a unique fex_id on the management console switch.

Figure 5:
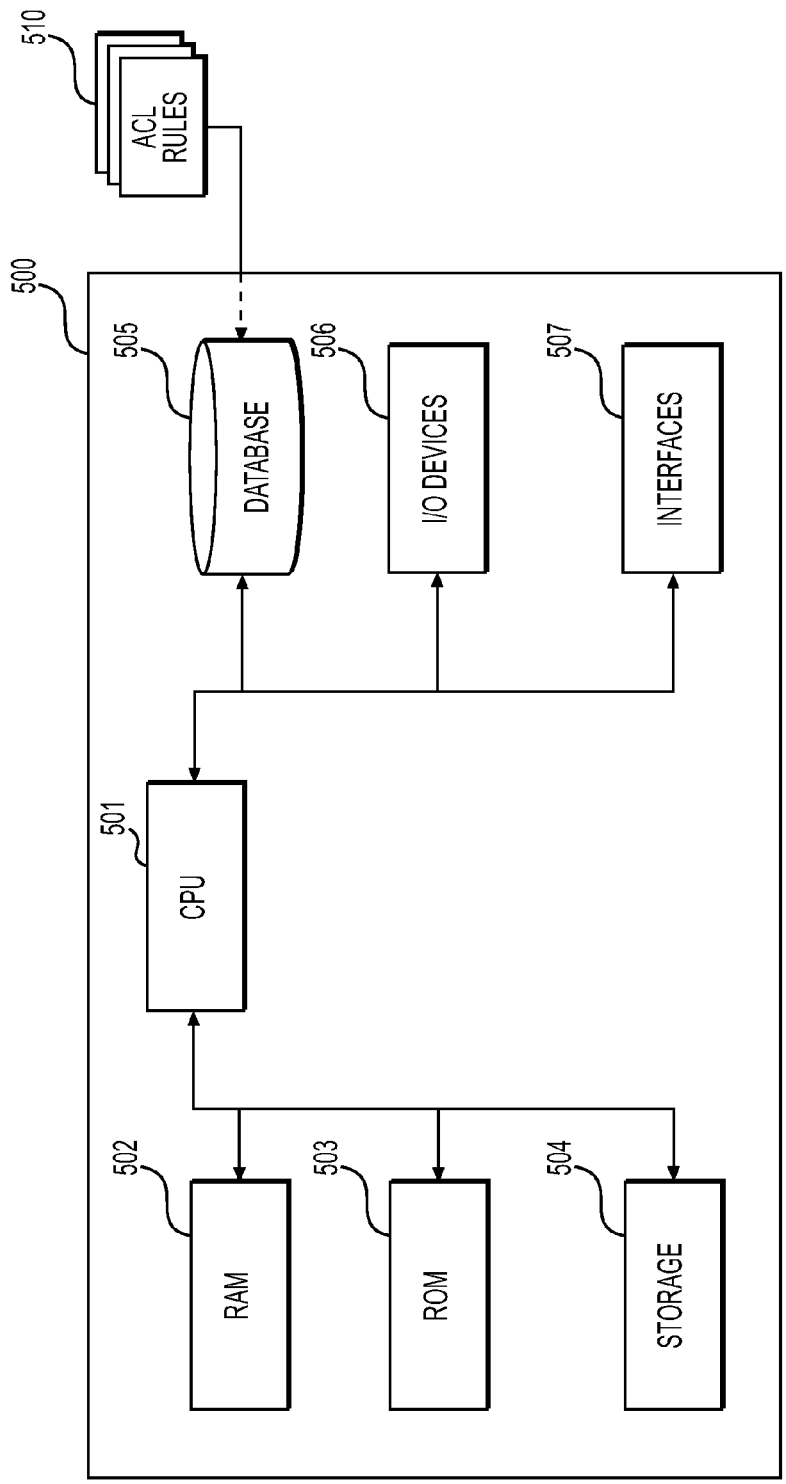
FIG. 5 is a schematic illustration of exemplary components associated with a control node and/or satellite nodes, and in which methods consistent with certain disclosed embodiments may be implemented.

According to one embodiment, and as illustrated in FIG. 5, management console 110 and satellite nodes 120, 130*a*, 140*a* may each include or embody a processor-based networking device 500 that is configured to transport network traffic using one or more specialized communication protocols. As illustrated in FIG. 5, networking device 500 may include one or more hardware and/or software components configured to execute software programs, such as software configuring port-extended network environment and formatting data for transporting network traffic over a fabric associated with the port-extended network environment.

Such a networking device may include one or more hardware components such as, for example, a central processing unit (CPU) or microprocessor 501, a random access memory (RAM) module 502, a read-only memory (ROM) module 503, a memory or data storage module 504, a database 505, one or more input/output (I/O) devices 506, and an interface 507. Alternatively and/or additionally, networking device 500 may include one or more software media components such as, for example, a computer-readable medium including computer-executable instructions for performing methods consistent with certain disclosed embodiments. It is contemplated that one or more of the hardware components listed above may be implemented using software. For example, storage 504 may include a software partition associated with one or more other hardware components of networking device 500. Networking device 500 may include additional, fewer, and/or different components than those listed above. It is understood that the components listed above are exemplary only and not intended to be limiting.

CPU 501 may include one or more processors, each configured to execute instructions and process data to perform one or more functions associated with networking device 500. As illustrated in FIG. 5, CPU 501 may be communicatively coupled to RAM 502, ROM 503, storage 504, database 505, I/O devices 506, and interface 507. CPU 501 may be configured to execute sequences of computer program instructions to perform various processes, which will be described in detail below. The computer program instructions may be loaded into RAM 502 for execution by CPU 501.

RAM 502 and ROM 503 may each include one or more devices for storing information associated with an operation of networking device 500 and/or CPU 501. For example, ROM 503 may include a memory device configured to access and store information associated with networking device 500, including information for identifying and registering MAC addresses associated with network compatible devices 130. RAM 502 may include a memory device for storing data associated with one or more operations of CPU 501. For example, ROM 503 may load instructions into RAM 502 for execution by CPU 501.

Storage 504 may include any type of mass storage device configured to store information that CPU 501 may need to perform processes consistent with the disclosed embodiments. For example, storage 504 may include one or more magnetic and/or optical disk devices, such as hard drives, CD-ROMs, DVD-ROMs, or any other type of mass media device. Alternatively or additionally, storage 504 may include flash memory mass media storage or other semiconductor-based storage medium.

Database 505 may include one or more software and/or hardware components that cooperate to store, organize, sort, filter, and/or arrange data used by networking device 500 and/or CPU 501. CPU 501 may access the information stored in database 505 to in order to identify, for example, ACL rules 510 associated with egress processing schemes in accordance with the disclosed embodiments. It is contemplated that database 355 may store additional and/or different information than that listed above.

I/O devices 506 may include one or more components configured to communicate information with a component (such as traffic database 325) or user associated with simulation environment 300. For example, I/O devices 506 may include a console with an integrated keyboard and mouse to allow a user to input parameters associated with networking device 500. I/O devices 506 may also include a display including a graphical user interface (GUI) for providing a network management console for network administrators to configure networking device 500. I/O devices 506 may also include peripheral devices such as, for example, a printer for printing information associated with networking device 500, a user-accessible disk drive (e.g., a USB port, a floppy, CD-ROM, or DVD-ROM drive, etc.) to allow a user to input data stored on a portable media device, a microphone, a speaker system, or any other suitable type of interface device. I/O devices may be configured to output simulation results, including updated traffic properties and test results 350 to traffic database 325.

Interface 507 may include one or more components configured to transmit and receive data via a communication network, such as the Internet, a local area network, a workstation peer-to-peer network, a direct link network, a wireless network, or any other suitable communication platform. For example, interface 507 may include one or more modulators, demodulators, multiplexers, demultiplexers, network communication devices, wireless devices, antennas, modems, and any other type of device configured to enable data communication via a communication network. According to one embodiment, interface 507 may be coupled to or include wireless communication devices, such as a module or modules configured to transmit information wirelessly using Wi-Fi or Bluetooth wireless protocols.

Processes and methods consistent with the disclosed embodiments makes use of the SVIF (Source Virtual Interface Identifier) to detect and apply special egress processing on specific packets. In addition to the regular ACL rules based on standard Ethernet headers, the solution provides a way to pass the packets through a specific set of ACLs if it has a particular SVIF. This can be done either by making the SVIF part of the standard lookup, or by having a separate table map out the SVIF to a particular label on which one or more ACLs can be applied.

As an example, a packet that will have to be sent across a blocked port will be sent with a reserved SVIF by the controller. The satellite will apply ACL rules against this SVIF, with the ACL rule matching BPDU destination MAC address. If there is a hit, the packet will be trapped to CPU. Software will pick up the packet and based on the DVIF, the packet will be forwarded to the specified port.

For ether channel, packets that need not be load balanced will be sent with another reserved SVIF. The ACL rule for this SVIF will redirect the packet to the CPU, and software will override load balancing and send the packet out on a particular ether channel member.

This solution can also be considered as a way to offload certain egress functionality to the satellite node, thereby allowing the management console to be more easily and efficiently scaled. In addition, the solution does not entail additional hardware costs for the satellite, thereby making it affordable. There is a cost with respect to SVIF, since we need to reserve a SVIF per lookup type. However, if we have an efficient SVIF utilization algorithm, this cost can be ignored.

Figure 6:
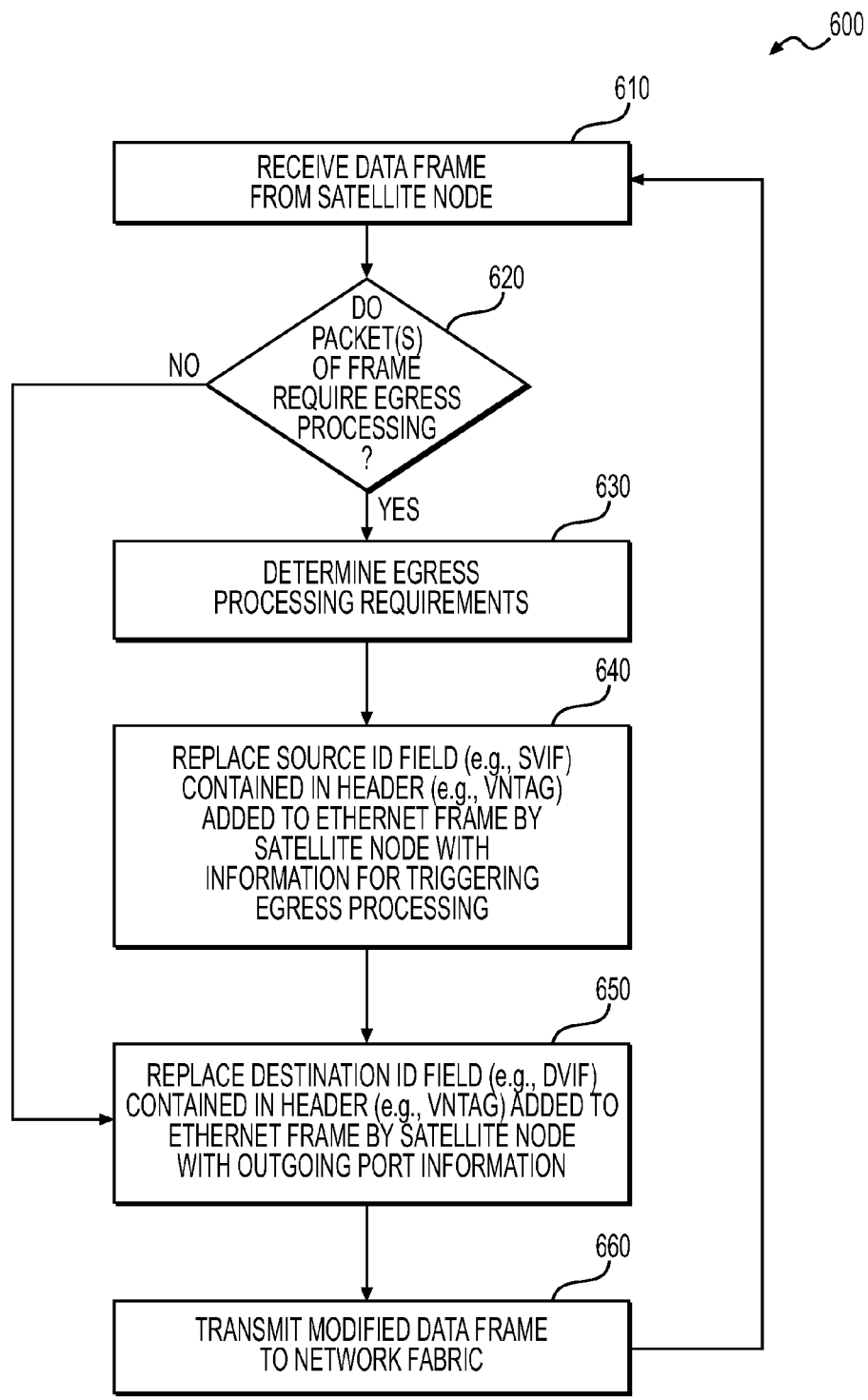
FIG. 6 is a flowchart depicting an exemplary process for designating packets for customized data processing in port-extended architectures, in accordance with certain disclosed embodiments.

This solution takes the entire SVIF space and allows it to be interpreted in different ways for packets based on direction. The value-add is for packets arriving on the port-extended uplink port ("southbound direction"), where the SVIF is used for applying egress marking and classification on packets. Since the SVIF is not used for unicast packets, and is used in "déjà vu" checks for multi-destination frames, this solution does not add much overhead to the existing SVIF space. FIG. 6 provides a flowchart 600 that describes an exemplary process for designating packets for customized data processing in port-extended architectures, in accordance with certain disclosed embodiments.

As illustrated in flowchart 600 of FIG. 6, the process commences upon receipt, at a management console 110, of a data frame from one of satellite nodes 120, 130a, 140a associated with port-extended system (Box 610). According to one exemplary embodiment, the data frame is passed to the management console 110 via the fabric by the satellite node that first received the payload on which the data frame is based. For example, the satellite node receives a first frame of data at an incoming port of the fabric. Because the satellite node is configured as a line card, the satellite node is configured to deliver the received data frame to the management console, where the switching and other L2 processing for delivering the frame to its ultimate destination can occur. As explained above, because the port-extended configuration process created some addressing complexities, the satellite node needs to add some additional information to the data frame to ensure that the message is properly communicated over the internal fabric.

According to an exemplary embodiment, this additional information may include a vnTag header that, as explained above, includes, among other things, source and destination virtual interface identifiers (SVIF and DVIF, respectively), which identify the (internal) fabric ports used to communicate information within the fabric network. As outlined above, when information is sent from the management console to the node that will transmit the information outside of the fabric network, the SVIF field becomes is rendered superfluous. Consequently, the bandwidth dedicated to the SVIF can be re-allocated to include instructions or other information indicative for, for example, performing any egress processing that may be required on the frame.

Upon receipt of the vnTagged frame from the satellite node that received the original frame, management console 110 may determine whether any of the packets of the frame require egress processing before ultimate transmission of the frame from outbound port of an outgoing satellite node (Box 620). If no egress processing is required (Step 620: No), management console may populate the destination ID (e.g., DVIF) field contained in the fabric header (e.g., vnTag), which was added to the frame by the incoming satellite node, with the port information associated with the outgoing satellite node (Box 650).

If, on the other hand, management console 110 determines that one or more packets of the frame requires specialized egress processing before outbound transmission from the fabric network (Box 620: Yes), management console may identify the egress processing requirements for the packet (Box 630). For example, management console 110 may determine, for example, that one or more packets may require supplemental processing, such as segmentation or encryption, on the services plane. In addition to the types of supplemental processing that may be required before forwarding, management console 110 may also identify the services nodes within the fabric for carrying out these processes.

Once the egress processing requirements and information have been identified by the management console 110, management console may replace the source ID field (e.g., SVIF) contained in the header (e.g., vnTag) that was added to the incoming data frame by the inbound satellite node, with information for triggering performance of the egress processing (Box 640). As explained, because management console 110 no longer requires the information contained in the SVIF field, management console 110 is configured to repurpose the bits dedicated to this SVIF field to carrying out any supplemental frame processing. Management console may also populate the destination ID (e.g., DVIF) field contained in the fabric header (e.g., vnTag), which was added to the frame by the incoming satellite node, with the port information associated with the outgoing satellite node (Box 650), and transmit the modified data frame (with the revised port-extended header information) to the network fabric for additional processing and/or egress from the fabric.

While this specification contains many specific implementation details, these should not be construed as limitations on the claims. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

It will be apparent to those skilled in the art that various modifications and variations can be made to the disclosed systems and methods for designating packets for customized data processing in port-extended architectures. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method for specialized processing of data in a port-extended network having a control node and a plurality of satellite nodes, the method comprising:
   receiving, by the control node of the port-extended network, a data frame, wherein the data frame includes, at a first field of the data frame, information indicative of an incoming port at which the data frame was received, the first field having been inserted by a satellite node associated with the port;
   determining, by the control node of the port-extended network, that one or more packets of a frame require specialized processing;
   replacing the information contained in the first field with information indicative of the specialized processing;
   replacing information contained in a second field with information indicative of an outgoing port of a second satellite node of the port-extended network; and
   transmitting, by the control node onto the port-extended network, a modified data frame, the modified data frame including a payload associated with the received data frame, the information indicative of the specialized processing in the first field, and the information indicative of the outgoing port in the second field,
   wherein determining that one or more packets of a frame require specialized processing further comprises determining that the one or more packets to be sent via the outgoing port is in a blocking state due, at least in part, to the outgoing port being shared between multiple virtual local area networks (VLANs), and
   wherein replacing the information contained in the first field includes inserting, by the control node, data for triggering an ACL policy for forwarding the one or more packets to the DVIF when the outgoing port is no longer in a blocking state.

2. The method of claim 1, wherein the first field of the data frame includes a source virtual interface field (SVIF) associated with a "virtual NIC tag" (vnTag) header inserted by the satellite node.

3. The method of claim 2, wherein the first second field of the data frame includes a destination virtual interface field (DVIF) associated with the vnTag header.

4. The method of claim 1, wherein replacing the information contained in the first field includes replacing the information with data for triggering a specified access control list (ACL) policy associated with the specialized processing.

5. The method of claim 1, wherein port-extended network is configured such that all L2/L3 lookup and forwarding associated with the port-extended network is done at the control node.

6. The method of claim 1, wherein the satellite node and the second satellite node are different machines.

7. A port-extendable system, comprising:
   a control node coupled to one or more satellite nodes, the control node configured to:
   receive a data frame that includes a first field having information indicative of an incoming port at which the data frame was received, the first field having been inserted by a satellite node associated with the port;
   determine that one or more packets of a frame require specialized processing by determining that the one or more packets to be sent via the outgoing port is in a blocking state due, at least in part, to the outgoing port being shared between multiple virtual local area networks (VLANs);
   replace the information contained in the first field with information indicative of the specialized processing by inserting, by the control node, data for triggering an ACL policy for forwarding the one or more packets to the DVIF when the outgoing port is no longer in a blocking state;
   replace information contained in a second field with information indicative of an outgoing port of a second satellite node of the port-extended network; and
   transmit a modified data frame that includes a payload associated with the received data frame, the information indicative of the specialized processing in the first field, and the information indicative of the outgoing port in the second field.

8. The port-extendable system of claim 7, further comprising a satellite node coupled to the control node and configured to generate the data frame by adding at least the first field having information indicative of the incoming port to a frame payload received at the satellite node.

9. The port-extendable system of claim 8, wherein the satellite node is configured to transmit the data frame to the control node via a fabric network associated with the port-extendable system.

10. The port-extendable system of claim 8, wherein the control node is configured to replace the information contained in the first field by deleting the information indicative of the incoming port and inserting data for triggering a specified access control list (ACL) policy associated with the specialized processing.

11. The port-extendable system of claim 7, wherein the first and second fields are included as part of a "virtual NIC tag" (vnTag) inserted by the satellite node upon receipt of a frame payload at the incoming port of the satellite node, wherein the vnTag.

12. The port-extendable system of claim 11, the first and second fields associated with a vnTag header inserted by the satellite node comprise a source virtual interface field (SVIF) and a destination virtual interface field (DVIF), respectively.

13. A method for reassigning unused frame tag headers for addressing packets for specialized egress processing, the method comprising:
   determining, by a control node of a fabric-extended system, that one or more packets of a frame are designated for specialized egress processing;
   replacing, by the control node, data contained in a "source vif_id field" (SVIF) of a "virtual NIC tag" (vnTag) with data associated with the specialized egress processing;
   replacing, by the control node, data contained in a "destination vif_id field" (DVIF) of the vnTag with data associated with an outgoing port of a satellite node of the fabric-extended system; and
   transmitting, by the control node, a data frame containing the vnTag to a fabric network associated with the fabric-extended system,
   wherein determining that one or more packets of a frame are designated for specialized egress processing further comprises determining that the one or more packets is to be sent via the outgoing port is in a blocking state due, at least in part, to the outgoing port being shared between multiple virtual local area networks (VLANs), and
   wherein replacing data contained in the SVIF of the vnTag includes inserting, by the control node, data for triggering an ACL policy for forwarding the one or more packets to the DVIF when the outgoing port is no longer in a blocking state.

14. The method of claim 13, wherein determining that one or more packets of a frame are designated for specialized egress processing further comprises:
   receiving, at the control node, the frame at a second satellite node of the fabric-extended system; and
   analyzing the frame to identify one or more packets that are designated for specialized egress processing.

15. The method of claim 13, wherein replacing data contained in the SVIF of the vnTag includes replacing the data with data for triggering a specified access control list (ACL) policy associated with the specialized egress processing.

16. The method of claim 13, wherein transmitting the data frame containing the vnTag to the fabric network includes transmitting the data frame containing the vnTag to the satellite node associated with the outgoing port.

* * * * *